United States Patent [19]

Pasbrig

[11] Patent Number: 4,467,827
[45] Date of Patent: Aug. 28, 1984

[54] VENTING AND DEGASIFYING VALVE FOR A LIQUID-FILLED SYSTEM

[75] Inventor: Max Pasbrig, Orselina, Switzerland

[73] Assignee: Lacrex Brevetti S.A., Orselina, Switzerland

[21] Appl. No.: 459,452

[22] Filed: Jan. 19, 1983

[30] Foreign Application Priority Data

Feb. 2, 1982 [DE] Fed. Rep. of Germany ....... 8202552

[51] Int. Cl.³ .............................................. F16K 24/00
[52] U.S. Cl. ...................................... 137/197; 137/199
[58] Field of Search ......................... 137/197, 199, 200

[56] References Cited

U.S. PATENT DOCUMENTS

| 2,314,963 | 3/1943 | Zelnis | 137/197 |
| 2,467,217 | 4/1949 | Mikeska | 137/197 |
| 2,845,080 | 7/1958 | Kraft | 137/199 X |
| 2,972,355 | 2/1961 | Schoerner | 137/197 |

FOREIGN PATENT DOCUMENTS 1500260 7/1965 Fed. Rep. of Germany ...... 137/199

Primary Examiner—Alan Cohan
Attorney, Agent, or Firm—Werner W. Kleeman

[57] ABSTRACT

Valve body or stopper 1, for screwing into a liquid-filled system, is divided by a partition 2 into an inner chamber 6 accommodating a valve ball 8 loaded by a spring 7 into a valve opening 3 in the partition 2, and outer chamber 9 through the wall of which are a plurality of vent openings 10. Closure plug 13 screws into the chamber 9 and has a stem 12 on which are stopper rings 14 which swell upon taking up moisture and which register with the vent openings 10 so as to close the latter if liquid penetrates the valve opening 3. To enable the system to be bled manually as desired, a spindle 17 extends axially through the stem 12 to protrude by one end from the plug 13. At the other end the spindle 17 carries a pusher portion 19 by which the ball 8 can be unseated, this pusher portion 19 having, at its end facing away from the ball 8, a closure surface which serves, when the ball 8 is not being lifted, to seal the facing end of the channel, in the stem 12, through which the spindle 17 extends.

5 Claims, 3 Drawing Figures

VENTING AND DEGASIFYING VALVE FOR A LIQUID-FILLED SYSTEM

This invention concerns a venting and degasifying valve, for a liquid-filled system, comprising a stopper for screwing into an opening in the system and which is subdivided, by a partition provided with a central valve opening into an inner chamber and an outer chamber, a valve ball disposed in the inner chamber and forced by a compression spring into the valve opening, a closure screw engaged with an internal thread in the outer chamber and having a stem on which are disposed stopping rings which swell when subjected to moisture, venting openings leading outwards from the outer chamber, in register with the stopping rings, and a pusher formed as an extension of the stem and disposed, in the screwed-in position of the closure screw, to project through the valve opening and into the inner chamber for lifting the valve ball.

In one venting valve of this kind (German Auslegeschrift No. 19 14 026), only one automatic venting operation is permitted by the swelling stopping rings. Once the stopping rings have been caused to swell up by the emergence of liquid, further emergence of air is prevented, even if air should still be present in the system. The same disadvantage occurs if the stopping rings should become jammed or clogged. In another known venting valve (German Pat. No. 15 50 554) an additional venting operation is indeed provided for, but this very complicated valve needs an additional housing. Also it is functional only in a perpendicular position, because if it is inclined sideways or in a horizontal position, liquid can escape in addition to air. Moreover, an additional venting operation is possible only when the stopping rings or discs are not swollen up, because otherwise a movable piston of the valve is jammed tight and movement of a closure member for opening a venting channel of the valve cannot occur.

The problem underlying the invention is, therefore, to improve a venting and degasifying valve, of the kind referred to in the introduction hereto, in such a way that additional venting operations can be effected at any time, manually, as may be desired.

To solve this problem, the present invention provides a venting and degasifying valve as aforesaid characterised in that, in the closure screw, in the stem, and possibly in the pusher, there is a venting channel displaceably accommodating, with clearance, a spindle which protrudes at the end, remote from the valve ball, of the closure screw and on the inner end of which at least a portion of the pusher is so fastened that a closure surface, formed on a reverse end of said portion, can be lifted from the venting channel end by means of the spindle.

With the valve of the invention, manual venting is possible at any time. Since the venting channel is additional to and is operative independently of the swelling stopper rings and is, therefore, not influenced by the rings, manual venting is effective even when only a lttle air, or no air at all is able to escape past the stopper rings. The valve of the invention is fully effective in any position of use. The advantages are achieved by extremely simple means, so that the slight additional expenditure involved therein is more than compensated.

Further preferable features of the invention are specified in the sub-claims following claim 1 at the end of this specification.

The invention will be described further, by way of example, with reference to the accompanying drawing, in which.

Figure 1:
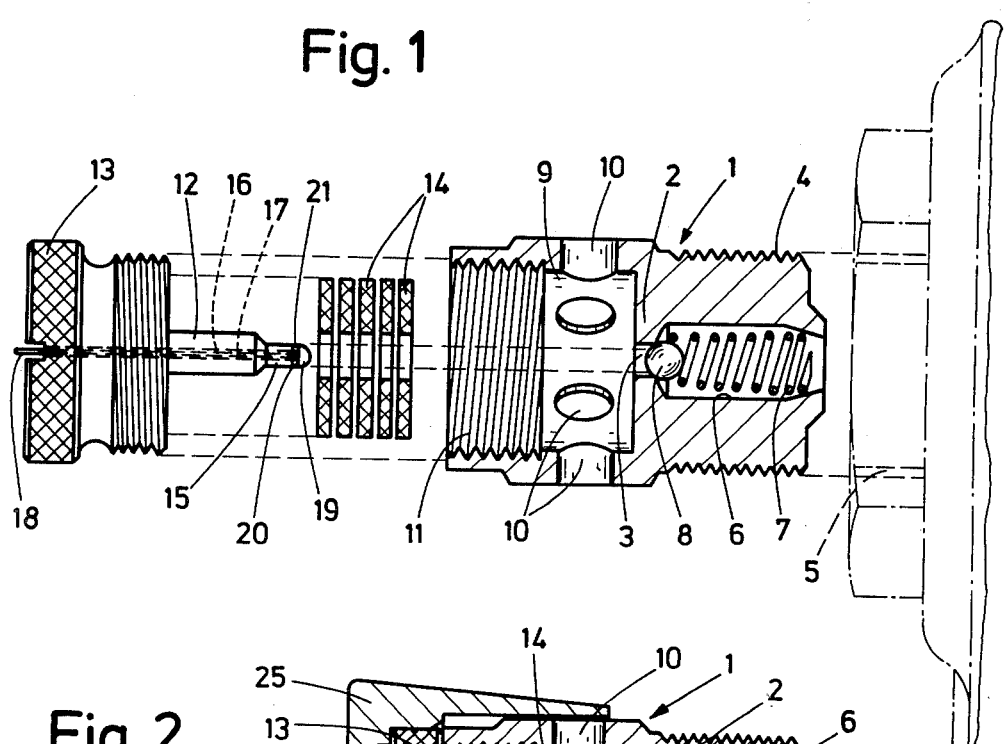
FIG. 1 is an exploded part-sectional view illustrating a first embodiment of the valve of the invention, the manner of fitting the valve into an opening in a liquid-filled system being shown.
Figure 2:
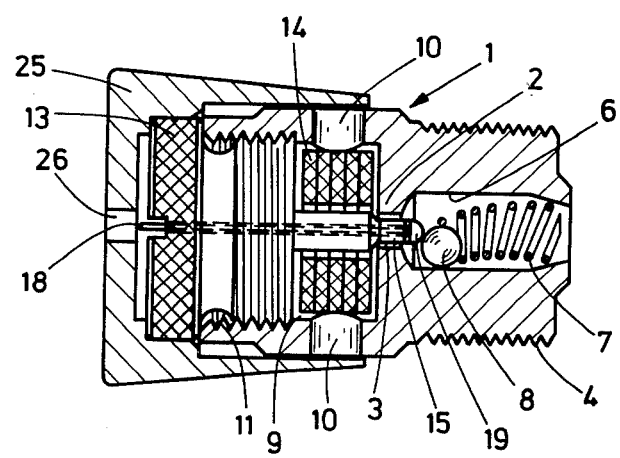
FIG. 2 is a fragmentary view illustrating the valve of FIG. 1 in its assembled and operated condition, and also showing a masking cap in position.

Referring firstly to FIGS. 1 and 2 of the drawing, a first embodiment of the venting and degasifying valve of the invention comprises a cylindrical stopper 1, which has approximately in its centre a partition or dividing wall 2 in which is a valve opening 3. Formed on one end is an external thread 4, by which the stopper 1 can be screwed into a stopper opening 5 in a liquid-filled system (e.g. a central-heating system) that is to be monitored (i.e. by which the system is vented or degasified). Accommodated in an inner chamber or bore 6 within this end of the stopper 1 is a conically-wound spring 7 which engages a valve ball 8 by its smaller end and forces the ball 8 into the valve opening 3 and thereby seals the system outwardly. Fluid-tight seating of the ball 8 is favoured by adapting the opening 3 in the partition 2 to such ball 8.

Formed at the other side of the dividing wall 2 is an outer chamber 9 with which connect radial venting openings 10 which open out into an externally hexagonal portion of the stopper 1, the hexagonal configuration serving to facilitate the screwing-in and screwing-out of the stopper 1 into and out of the stopper opening 5. At the front end, the outer chamber 9 has an internal thread 11 into which a closure screw 13 is engaged. This closure screw 13 has a coaxial stem 12 on the free end of which is a pusher body 15 formed as a smaller-diameter extension of the stem 12. If, from the FIG. 1 condition, the closure screw 13 is screwed inwards of the stopper 1, stopper rings 14, which swell when moistened, are assembled on the stem 12 and the pusher 15 projects through the opening 3 and lifts the valve ball 8 from its closure position as is shown in FIG. 2.

The closure screw 13, the stem 12 and the pusher 15 are formed with a central bore which serves as a venting channel 16 through which a spindle 17 extends with a clearance. The spindle 17 protrudes by its rear end 18 (i.e. its end remote from the ball 8) from the corresponding end of the screw 13. At its front end, the spindle 17 carries a pusher cap 19, which is adapted to the shape of the pusher body 15 and masks, by a closing surface 20, the confronting end of the venting channel 16. A sealing washer 21 may be interposed between the pusher cap 19 and the pusher body 15. The stem 12, the pusher body 15 and the cap 19 are of such a length that the valve ball 8 can be lifted out of its closure position therewith, as has been shown in FIG. 2. In this lifted position, any air present in the liquid-filled system can enter, through the valve opening 3, into the annular space around the stopper rings 14 and emerge through the radial venting openings 10. If, however, water should emerge through the same path, then the stopper rings 14 swell up and in so doing seal the passage. Then, of course, no further water can flow out through the valve. If the stopper rings 14 are to be exchanged at any time, then only the closure screw 13 needs to be removed, whereupon the valve ball 8 once again seals off the valve opening 3.

If it should transpire that air is still present in the liquid system, after the swollen stopper rings 14 have shut off the venting path, then the spindle 17 can be pressed inwards by hand, by pressing on the end 18, so that the pusher cap 19 is moved away from the pusher body 15, or from the sealing ring 21 if present. As a result, the venting channel 16 is opened, and air can escape outwardly through the channel 16. When the venting operation is concluded, it is only necessary to release the spindle 17 and the compression spring 7 restores the pusher cap 19 back once again into its closing position.

This valve construction in accordance with the invention provides for two mutually-independent venting and degasifying possibilities; one therefore obtains a considerable improvement in the functional reliability of the valve, because the venting operation can be effected by way of the venting channel 16 at any time as may be desired, irrespective of the condition of the stopper rings 14.

Preferably the valve additionally includes a masking cap 25, conveniently of a plastics material which cap 25 has a skirt and, when fitted over the stopper 1, prevents the closure screw 13 or the spindle 17 from being actuated unintentionally. Furthermore, the cap 25 may have a hole 26 which is aligned with the spindle 17 and through which the spindle 17 may, if desired, be actuated without having to remove the cap 25, which, moreover, prevents any substantial amount of condensation from accummulating in the cap.

Figure 3:
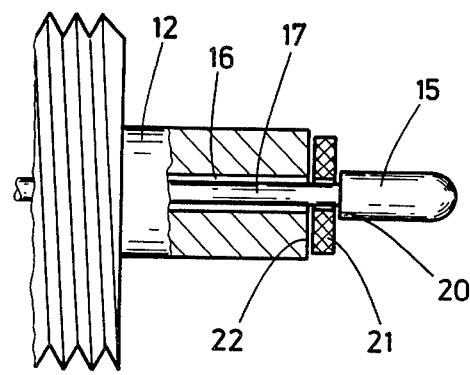
FIG. 3 is an enlarged part-sectional view of a detail of a second embodiment of the valve of the invention.

Shown in FIG. 3 is a alternative form for the arrangement which seals the venting channel 16. The stem 12 ends, in this case, shortly in front of the valve opening 3. The spindle 17 carries the entire pusher 15, so that its closure surface 20 faces end surface 22 of the stem 12. The diameter of the pusher 15 is so great that the closing surface 20 will close the venting channel 16 even when a sealing disc 21 is not present.

The venting channel 16 can, of course, end at any position along the pusher. For instance, it could extend as far as the tip of the pusher being sealable there by means of a suitable valve plate, disc or the like fastened to the spindle 17, and so arranged that it will contact with the valve ball 8.

I claim:

1. A venting and degasifying valve, for a liquid-filled system, comprising a stopper for screwing into an opening in the system and which is subdivided, by a partition provided with a central valve opening, into an inner chamber and an outer chamber, a valve ball disposed in the inner chamber and forced by a compression spring into the valve opening, a closure screw engaged an internal thread in the outer chamber and having a stem on which are disposed stopping rings which swell when subjected to moisture, venting openings leading outwards from the outer chamber in register with the stopping rings and a pusher formed as an extension of the stem and disposed, in the screwed-in position of the closure screw, to project through the valve opening and into the inner chamber for lifting the valve ball, characterised in that, in the closure screw, in the stem, and possibly in the pusher, there is a venting channel displaceably accommodating, with a clearance, a spindle which protrudes at the end, remote from the valve ball, of the closure screw and on the inner end of which at least a portion of the pusher is so fastened that a closure surface, formed on a reverse end of said portion, can be lifted from the venting channel end by means of the spindle.

2. A valve as claimed in claim 1 characterised in that the stem ends shortly in front of the valve opening and the entire pusher is fastened to the spindle.

3. A valve as claimed in claim 1 characterised in that a front pusher cap is fastened on the spindle.

4. A valve as claimed in claim 1, 2 or 3 characterised in that a sealing washer is disposed between the closure surface of the pusher and the venting channel end.

5. A valve as claimed in claim 1 characterised in that a masking cap having a skirt is provided for masking the ventilation openings.

* * * * *